United States Patent
Yang et al.

(10) Patent No.: US 9,571,227 B2
(45) Date of Patent: Feb. 14, 2017

(54) LINK ADAPTATION FEEDBACK METHOD AND TRANSMITTING DEVICE

(71) Applicant: Huawei Technologies Co., Ltd., Shenzhen (CN)

(72) Inventors: Lvxi Yang, Shenzhen (CN); Hao Li, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/139,327

(22) Filed: Dec. 23, 2013

(65) Prior Publication Data

US 2014/0112183 A1  Apr. 24, 2014

Related U.S. Application Data

(63) Continuation of application No. PCT/CN2012/072918, filed on Mar. 23, 2012.

(30) Foreign Application Priority Data

Jun. 24, 2011  (CN) .......................... 2011 1 0174176
Jul. 30, 2011  (CN) .......................... 2011 1 0216651

(51) Int. Cl.
*H04W 24/08*  (2009.01)
*H04L 1/00*   (2006.01)
*H04L 1/06*   (2006.01)

(52) U.S. Cl.
CPC ........... *H04L 1/0009* (2013.01); *H04L 1/0025* (2013.01); *H04L 1/0643* (2013.01); *H04W 24/08* (2013.01)

(58) Field of Classification Search
USPC ........................................................ 370/252
See application file for complete search history.

(56) References Cited

U.S. PATENT DOCUMENTS

| 8,411,632 B2* | 4/2013 | Kneckt ................. H04W 74/04 370/252 |
| 2006/0209749 A1 | 9/2006 | Blanz et al. |
| 2007/0129018 A1 | 6/2007 | Trainin et al. |
| 2009/0086855 A1* | 4/2009 | Jin ........................ H04L 1/0003 375/341 |
| 2011/0096797 A1* | 4/2011 | Zhang ................. H04B 7/0669 370/474 |
| 2011/0110349 A1 | 5/2011 | Grandhi |

(Continued)

FOREIGN PATENT DOCUMENTS

CN  101277167 A  10/2008
CN  102045096 A  5/2011

OTHER PUBLICATIONS

Zhao et al., "Distributed scheduling algorithm for multiuser MIMO downlink with adaptive feedback" Journal of Jilin University (Engineering and Technology Edition) vol. 41, No. 2, Mar. 2011, 6 pages.

(Continued)

*Primary Examiner* — Andrew Lai
*Assistant Examiner* — Jamaal Henson
(74) *Attorney, Agent, or Firm* — Brinks Gilson & Lione

(57) ABSTRACT

Embodiments of the present invention provide a link adaptation feedback method and a transmitting device. The method includes: receiving, by a transmitting device, a link adaptation feedback frame sent by a receiving device, where the link adaptation feedback frame carries space-time block coding type indication information; and determining, by the transmitting device according to the space-time block coding type indication information, information about use of space-time block coding by a data frame related to the link adaptation feedback frame, and selecting, according to the use information, a space-time stream, and a modulation and coding scheme used when the transmitting device sends a data frame. Through the embodiments of the present invention, and according to the use information, the transmitting (Continued)

device may select the space-time stream, and the MCS used when the transmitting device sends a data frame, thereby improving link performance.

18 Claims, 3 Drawing Sheets

(56) References Cited

U.S. PATENT DOCUMENTS

| | | | |
|---|---|---|---|
| 2011/0222415 A1* | 9/2011 | Ramamurthi | H04L 1/0003 370/252 |
| 2012/0113861 A1* | 5/2012 | Chun | H04L 1/0025 370/252 |
| 2012/0269183 A1* | 10/2012 | Sohn | H04L 1/0025 370/338 |
| 2013/0235836 A1 | 9/2013 | Roh et al. | |
| 2014/0105200 A1* | 4/2014 | Seok | H04W 72/0406 370/338 |

OTHER PUBLICATIONS

IEEE, Draft Standard for Information Technology—Telecommunications and information exchange between systems—Local and metropolitan area networks—Specific requirements, Part 11: Wireless LAN Medium Access Control (MAC) and Physical Layer (PHY) specifications; Amendment 5: Enhancements for Very High Throughput for Operation in Bands below 6 GHz, IEEE P802.11ac™/D1.2, 2011, 417 pages.

IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, IEEE Std 802.11-2007, Jun. 12, 2007, 1232 pages.

Liu, Yong et al., "VHT Capabilities and Operation Elements and VHTC Field," IEEE 802.11-10/1267r0, Nov. 8, 2010, 19 pages.

Merlin, Simone, Wireless LANs 11ac HT Control Field, Mar. 2011, retrieved from <https://mentor.ieee.org/802.11/dcn/11/11-1-0345-00-00ac-comments-resolution-ht-control-field-docx,> on Jul. 28, 2016, 16 pages.

* cited by examiner

| B0 | B1 | B2 | B3 B5 | B6 B8 | B9 B23 | B24 B26 | B27 | B28 | B29 | B30 | B31 |
|---|---|---|---|---|---|---|---|---|---|---|---|
| VHT=1 | Reserved | MRQ | MSI | MFSI/GID-L | MFB | GID-H | Coding type | Feedback Tx type | Unsolicited MFB | Access category constraint | RDG/More PPDU |
| Bit:1 | 1 | 1 | 3 | 3 | 15 | 3 | 1 | 1 | 1 | 1 | 1 |

| B9 | B11 | B12 B15 | B16 B17 | B18 B23 |
|---|---|---|---|---|
| VHT N_STS | | MCS | BW | SNR |
| Bit: 3 | | 4 | 2 | 6 |

LINK ADAPTATION FEEDBACK METHOD AND TRANSMITTING DEVICE

CROSS-REFERENCE TO RELATED APPLICATIONS

This application is a continuation of International Application No. PCT/CN2012/072918, filed on Mar. 23, 2012, which claims priority to Chinese Patent Application No. 201110174176.5, filed on Jun. 24, 2011 and Chinese Patent Application No. 201110216651.0, filed on Jul. 30, 2011, all of which are hereby incorporated by reference in their entireties.

TECHNICAL FIELD

Embodiments of the present invention relate to the field of communications technologies, and in particular, to a link adaptation feedback method and a transmitting device.

BACKGROUND

The physical layer of a wireless local area network supports a link adaptation technology. The main procedure of the link adaptation technology is: After a transmitter sends data to a user by using a certain modulation and coding scheme (Modulation and Coding Scheme, hereinafter briefly referred to as MCS), due to the impact of channel conditions, and because a receiver can estimate actual channel state information, the receiver calculates parameters such as parameters related to the channel conditions and the recommended MCS according to the channel conditions and transmission conditions (for example, the MCS) after receiving the data, and feeds back the parameters to the transmitter. After obtaining the parameters fed back by the receiver, the transmitter adjusts and selects a proper modulation and coding scheme to reduce the bit error rate of data transmission. The process of adjusting the MCS of the transmitter through modulation and coding scheme feedback (Modulation and Coding Scheme Feedback, hereinafter briefly referred to as MFB) of the receiver is a typical representative of the link adaptation technology.

A conventional wireless local area network system supports two feedback mechanisms, i.e., passive feedback and active feedback. Passive feedback means that after the transmitter sends a modulation and coding scheme feedback request (MFB Request, hereinafter briefly referred to as MRQ) to the receiver, the receiver immediately provides MFB with respect to the data of the previous frame sent by the transmitter; active feedback means that the receiver actively provides MFB, without requiring the transmitter to send a request. The active feedback may relate to the data of any one frame or multiple frames sent by the transmitter previously.

The active feedback differs from the passive feedback mainly in that the active feedback does not require the transmitter to send a request. The benefit of the active feedback is that the receiver may actively provide MFB according to actual conditions, thereby having higher flexibility. However, the active feedback has the following disadvantage: The transmitter is unable to know the data of which frame sent by the transmitter is related to the adaptation feedback of the receiver, because the receiver may provide feedback with respect to the data of any one frame sent by the transmitter previously. Therefore, the transmitter needs to know the transmission conditions used when the transmitter sends the data previously, e.g., a coding type (Coding Type), a group identifier (Group Identifier, hereinafter briefly referred to as "Group ID"), and whether to use beamforming.

However, in the conventional active link adaptation feedback mechanism, feedback information is not complete, which leads to a poor effect of link adaptation.

SUMMARY

Embodiments of the present invention provide a link adaptation feedback method and a transmitting device, so that feedback information in the active link adaptation feedback mechanism is more complete, thereby improving link performance.

An embodiment of the present invention provides a link adaptation feedback method, including:

receiving, by a transmitting device, a link adaptation feedback frame sent by a receiving device, where the link adaptation feedback frame carries space-time block coding (STBC) type indication information; and determining, by the transmitting device according to the space-time block coding type indication information, information about use of space-time block coding by a data frame related to the link adaptation feedback frame, and selecting, according to the use information, a space-time stream, a bandwidth, and a modulation and coding scheme used when the transmitting device sends a data frame.

An embodiment of the present invention also provides a transmitting device, including:

a receiving module, configured to receive a link adaptation feedback frame sent by a receiving device, where the link adaptation feedback frame carries space-time block coding type indication information;

a determining module, configured to determine, according to the space-time block coding type indication information, information about use of space-time block coding by a data frame related to the link adaptation feedback frame; and a selecting module, configured to select, according to the use information determined by the determining module, a space-time stream, a bandwidth, and a modulation and coding scheme used when the transmitting device sends a data frame.

Through the embodiments of the present invention, after the transmitting device receives the link adaptation feedback frame sent by the receiving device, the information about use of STBC by a data frame related to the link adaptation feedback frame can be determined according to the space-time block coding (Space Time Block Code, hereinafter briefly referred to as STBC) type indication information in the link adaptation feedback frame. Therefore, the feedback information in the active link adaptation feedback mechanism is more complete, and according to the use information, the transmitting device may select the space-time stream, the bandwidth, and the MCS used when the transmitting device sends a data frame, thereby improving link performance.

DESCRIPTION OF EMBODIMENTS

In order to make the objectives, technical solutions, and advantages of the embodiments of the present invention more comprehensible, the technical solutions in the embodiments of the present invention are described clearly and completely in the following with reference to the accompanying drawings in the embodiments of the present invention. Obviously, the embodiments to be described are part of rather than all of the embodiments of the present invention. All other embodiments obtained by a person of ordinary skill in the art based on the embodiments of the present invention without creative efforts shall fall within the protection scope of the present invention.

Figures 1, 2, 3:
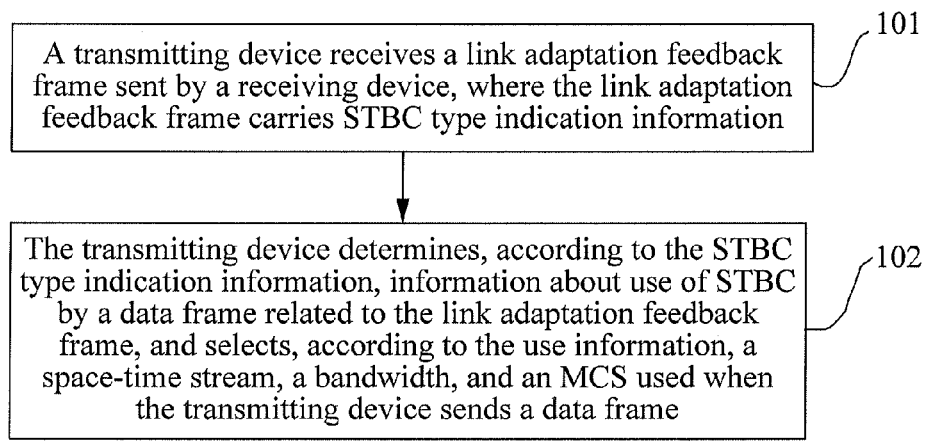
FIG. 1 is a flowchart of a link adaptation feedback method according to an embodiment of the present invention.
FIG. 2 is a schematic diagram of a format of a very high throughput format high throughput control field according to an embodiment of the present invention.
FIG. 3 is a schematic diagram of a format of an MFB subfield according to an embodiment of the present invention.

FIG. 1 is a flowchart of a link adaptation feedback method according to an embodiment of the present invention. As shown in FIG. 1, the link adaptation feedback method may include:

Step 101: A transmitting device receives a link adaptation feedback frame sent by a receiving device, where the link adaptation feedback frame carries STBC type indication information.

Step 102: The transmitting device determines, according to the STBC type indication information, information about use of STBC by a data frame related to the link adaptation feedback frame, and selects, according to the use information, a space-time stream, a bandwidth, and an MCS used when the transmitting device sends a data frame.

In an implementation manner of this embodiment, the procedure for the transmitting device to determine, according to the STBC type indication information, information about use of STBC by a data frame related to the link adaptation feedback frame may be: If the STBC type indication information indicates that the link adaptation feedback frame is fed back with respect to a frame not using STBC, the transmitting device determines that the data frame related to the link adaptation feedback frame does not use STBC; and if the STBC type indication information indicates that the link adaptation feedback frame is fed back with respect to a frame using STBC, the transmitting device determines that the data frame related to the link adaptation feedback frame uses STBC.

In another implementation manner of this embodiment, the procedure for the transmitting device to determine, according to the STBC type indication information, information about use of STBC by a data frame related to the link adaptation feedback frame may be: If on condition that beamforming (Beamforming) is not used, the STBC type indication information indicates that the link adaptation feedback frame is fed back with respect to a frame not using STBC, the transmitting device may determine on condition that BF is not used, that the data frame related to the link adaptation feedback frame does not use STBC; and if on condition that BF is not used, the STBC type indication information indicates that the link adaptation feedback frame is fed back with respect to a frame using STBC, the transmitting device may determine on condition that BF is not used, that the data frame related to the link adaptation feedback frame uses STBC.

In this embodiment, the link adaptation feedback frame may be a very high throughput format high throughput control field (Very High Throughput format High Throughput Control field, hereinafter briefly referred to as "VHT format HT Control field"); and the procedure for the link adaptation feedback frame to carry the STBC type indication information may be: adding an STBC type (STBC Type) field to the VHT format HT Control field, to use a value of the STBC type field as the STBC type indication information.

In the above embodiment, after the transmitting device receives the link adaptation feedback frame sent by the receiving device, the information about use of STBC by a data frame related to the link adaptation feedback frame can be determined according to the STBC type indication information in the link adaptation feedback frame. Therefore, feedback information in the active link adaptation feedback mechanism is more complete, and according to the use information, the transmitting device may select the space-time stream, the bandwidth, and the MCS used when the transmitting device sends a data frame, thereby improving link performance.

Further, in still another implementation manner of this embodiment, the transmitting device may further determine, according to the information about use of STBC by a data frame related to the link adaptation feedback frame, whether the data frame sent by the transmitting device uses STBC. The procedure for the transmitting device to determine, according to the STBC type indication information, information about use of STBC by a data frame related to the link adaptation feedback frame may be: If the STBC type indication information indicates that the link adaptation feedback frame does not recommend (suggest) the use of STBC, the transmitting device will determine with reference to the information that the data frame related to the link adaptation feedback frame does not use STBC; and if the STBC type indication information indicates that the link adaptation feedback frame recommends the use of STBC, the transmitting device will determine with reference to the information that the data frame related to the link adaptation feedback frame uses STBC.

Further, after the transmitting device receives the link adaptation feedback frame sent by the receiving device, the STBC use information of the data frame recommended by the link adaptation feedback frame can be determined according to the STBC type indication information in the link adaptation feedback frame. Therefore, the feedback information in the link adaptation feedback mechanism is more complete, and according to the information, the transmitting device may select a space-time stream, a spatial stream, a bandwidth, an MCS, and whether to use STBC for the next data frame, which are used when the transmitting device sends the data frame, thereby improving link performance.

A conventional standard defines that the VHT format HT Control field is used for MFB. The format of the VHT format HT Control field is shown in FIG. 2. FIG. 2 is a schematic diagram of a format of a very high throughput format high throughput control field according to an embodiment of the present invention.

As shown in FIG. 2, the VHT format HT Control field includes: a VHT field, a reserved (reserved) field, an MRQ field, an MRQ sequence identifier (MRQ Sequence Identifier, hereinafter briefly referred to as MSI) field, an MFB sequence identifier (MFB Sequence Identifier, hereinafter briefly referred to as MFSI)/least significant bits of group identifier (Least Significant Bits of Group Identifier, hereinafter briefly referred to as GID-L) field, an MFB subfield, a most significant bits of group identifier (Most Significant Bits of Group Identifier, hereinafter briefly referred to as GID-H) field, a coding type (Coding Type) field, a feedback Tx type (Feedback Tx Type, hereinafter briefly referred to as FB Tx Type) field, an unsolicited (Unsolicited) MFB field, an access category constraint (Access Category Constraint, hereinafter briefly referred to as AC Constraint) field, and a reverse direct grant (Reverse Direct Grant, hereinafter briefly referred to as RDG)/more physical layer convergence procedure protocol data unit (More Physical Layer Convergence Procedure Protocol Data Unit, hereinafter briefly referred to as More PPDU) field.

The FB Tx Type field indicates whether BF is used when the transmitting device sends the data frame in the context of active feedback, where "0" indicates that BF is not used, and "1" indicates that BF is used.

The MFB subfield (B9-B23) includes a space-time stream, a bandwidth, and an MCS recommended by a receiving device, and a signal to noise ratio (Signal to Noise Ratio, hereinafter briefly referred to as SNR) estimated by the receiving device, and so on. FIG. 3 is a schematic diagram of a format of an MFB subfield according to an embodiment of the present invention. As shown in FIG. 3, the MFB subfield may include a very high throughput (Very High Throughput, hereinafter briefly referred to as VHT) number of space-time streams (Number of Space-Time Streams, hereinafter briefly referred to as N_STS) field, an MCS field, a bandwidth (Bandwidth, hereinafter briefly referred to as BW) field, and an SNR field. That is, the receiving device carries a space-time stream recommended by the receiving device in the VHT N_STS field, carries an MCS recommended by the receiving device in the MCS field, carries a BW recommended by the receiving device in the BW field, and carries an SNR estimated by the receiving device in the SNR field.

However, the VHT format HT Control field does not have information to indicate whether STBC is used when the transmitting device sends a data frame, but only indicates whether BF is used. Actually, there is no necessary relationship between whether STBC is used and whether BF is used, that is, STBC may also be used when BF is used; and it is not necessary to use STBC when BF is not used. However, on condition that BF is not used, using STBC can obtain more transmit diversity gains (at least 3 dB). Therefore, whether BF and STBC are used or not has an impact on the content carried by the MFB subfield, and further affects the selection by the transmitting device of the space-time stream, the bandwidth, and the MCS used when the transmitting device sends a data frame.

However, the VHT format HT Control field does not have information to indicate whether STBC is used when the transmitting device sends a data frame, which may cause that the transmitting device cannot properly select the space-time stream, the bandwidth, and the MCS used when the transmitting device sends a data frame, thereby reducing the effect of the link adaptation.

In the link adaptation feedback method provided by the embodiment of the present invention, the STBC type field is added to the VHT format HT Control field, and the length of the STBC type field is one bit. In the embodiment of the present invention, the value of the STBC type field is used as the STBC type indication information.

Specifically, in an implementation manner of the embodiment of the present invention, the value of the STBC type field may be set to indicate that the VHT format HT Control field is fed back with respect to a frame not using STBC, or the value of the STBC type field may be set to indicate that the VHT format HT Control field is fed back with respect to a frame using STBC.

In a specific implementation, the value of the STBC type field may be set to "0" to indicate that the VHT format HT Control field is fed back with respect to a frame not using STBC, and the value of the STBC type field may be set to "1" to indicate that the VHT format HT Control field is fed back with respect to a frame using STBC, or vice versa. The setting mode of the value of the STBC type field is not limited in the embodiment of the present invention, as long as it can be indicated whether the VHT format HT Control field is fed back with respect to a frame not using STBC or with respect to a frame using STBC.

In this implementation manner, after the transmitting device receives the VHT format HT Control field sent by the receiving device and reads the value of the FB Tx Type field, the transmitting device can know whether the data frame related to the VHT format HT Control field uses BF; and after reading the value of the STBC type field, the transmitting device can know whether the data frame related to the VHT format HT Control field uses STBC. Therefore, feedback information in the active link adaptation feedback mechanism is more complete, and according to STBC use information in combination with the space-time stream, the bandwidth, and the MCS recommended by the receiving device in the MFB subfield, and the SNR estimated by the receiving device, the transmitting device may select the space-time stream, the bandwidth, and the MCS used when the transmitting device sends a data frame, thereby improving link performance.

In another implementation manner of the embodiment of the present invention, on condition that BF is not used, the value of the STBC type field may be set to indicate that the VHT format HT Control field is fed back with respect to a frame not using STBC; or on condition that BF is not used, the value of the STBC type field may be set to indicate that the VHT format HT Control field is fed back with respect to a frame using STBC. That is, in this implementation manner, only on condition that BF is not used (that is, the value of the FB Tx Type field is "0"), the value of the STBC type field indicates whether the VHT format HT Control field is fed back with respect to a frame using STBC or with respect to a frame not using STBC.

In a specific implementation, on condition that beamforming is not used, the value of the STBC type field may be set to "0" to indicate that the VHT format HT Control field is fed back with respect to a frame not using STBC, and on condition that BF is not used, the value of the STBC type field may be set to "1" to indicate that the VHT format HT Control field is fed back with respect to a frame using STBC, or vice versa. The setting mode of the value of the STBC type field is not limited in the embodiment of the present invention, as long as on condition that BF is not used, it can be indicated whether the VHT format HT Control field is fed back with respect to a frame not using STBC or feedback with respect to a frame using STBC.

In this implementation manner, after the transmitting device receives the VHT format HT Control field sent by the receiving device and reads the value of the FB Tx Type field, the transmitting device can know whether the data frame related to the VHT format HT Control field uses BF; and on condition that BF is not used (that is, the value of the FB Tx Type field is "0"), after reading the value of the STBC type field, the transmitting device can know whether the data frame related to the VHT format HT Control field uses STBC. Therefore, feedback information in the active link adaptation feedback mechanism is more complete, and according to STBC use information in combination with the space-time stream, the bandwidth, and the MCS recommended by the receiving device in the MFB subfield, and the SNR estimated by the receiving device, the transmitting device may select the space-time stream, the bandwidth, and the MCS used when the transmitting device sends a data frame, thereby improving link performance.

In another implementation manner of the embodiment of the present invention, the value of the STBC type field may be set to indicate that the VHT format HT Control field recommends a subsequent data frame not to use STBC; or the value of the STBC type field may be set to indicate that the VHT format HT Control field recommends the subsequent data frame to use STBC.

In a specific implementation, the value of the STBC type field may be set to "0" to indicate that the VHT format HT Control field recommends the subsequent data frame not to use STBC; and the value of the STBC type field may be set to "1" to indicate that the VHT format HT Control field recommends the subsequent data frame to use STBC. Definitely, the value may be negated. The setting mode of the value of the STBC type field is not limited in the embodiment of the present invention, as long as it can be indicated whether the VHT format HT Control field recommends the subsequent frame not to use STBC or recommends the subsequent frame to use STBC.

In this implementation manner, after the transmitting device receives the VHT format HT Control field sent by the receiving device and reads the value of the STBC type field, the transmitting device can know whether the subsequent data frame related to the VHT format HT Control field is recommended to use STBC; and further, according to recommended Nsts (number of space-time streams), the transmitting device may know recommended Nss (number of spatial streams). Therefore, feedback information in the active link adaptation feedback mechanism is enriched, and according to STBC use information in combination with the space-time stream, the bandwidth, and the MCS recommended by the receiving device in the MFB subfield, the calculated spatial stream, and the SNR estimated by the receiving device, the transmitting device may select the space-time stream, the spatial stream, the bandwidth, and the MCS used when the transmitting device sends a data frame, and whether to use STBC for the subsequent data frame, thereby improving link performance.

A person of ordinary skill in the art should understand that all or part of the steps of the method according to the above embodiments may be implemented by a program instructing relevant hardware. The program may be stored in a computer readable storage medium. When the program is run, the steps of the method according to the above embodiments are executed. The storage medium may be any medium capable of storing program codes, such as a ROM, a RAM, a magnetic disk, or a CD-ROM.

Figure 4:
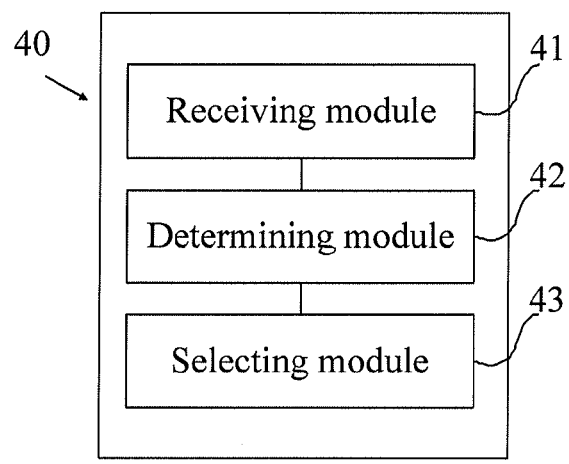
FIG. 4 is a schematic structural diagram of a transmitting device according to an embodiment of the present invention.

FIG. 4 is a schematic structural diagram of a transmitting device according to an embodiment of the present invention. The transmitting device in this embodiment may implement the process of the embodiment of the present invention shown in FIG. 1. The transmitting device in the embodiment of the present invention may be an access point (Access Point, hereinafter briefly referred to as AP) in a wireless local area network. In the wireless local area network, a beamformer (beamformer) obtains channel information and link information by receiving a feedback from a beamformee (beamformee). As shown in FIG. 4, the transmitting device 40 may include:

a receiving module 41, configured to receive a link adaptation feedback frame sent by a receiving device, where the link adaptation feedback frame carries STBC type indication information;

a determining module 42, configured to determine, according to the STBC type indication information, information about use of STBC by a data frame related to the link adaptation feedback frame; and a selecting module 43, configured to select, according to the use information determined by the determining module 42, a space-time stream, a bandwidth, and an MCS used when the transmitting device sends a data frame.

In this embodiment, the link adaptation feedback frame may be a VHT format HT Control field; and the procedure for the link adaptation feedback frame to carry the STBC type indication information may be: adding an STBC type field to the VHT format HT Control field, to use a value of the STBC type field as the STBC type indication information.

In the above embodiment, after the receiving module 41 receives the link adaptation feedback frame sent by the receiving device, the determining module 42 determines, according to the STBC type indication information in the link adaptation feedback frame, information about use of STBC by a data frame related to the link adaptation feedback frame. Therefore, feedback information in the active link adaptation feedback mechanism is more complete, and according to the use information, the selecting module 43 may select the space-time stream, the bandwidth, and the MCS used when the transmitting device sends a data frame, thereby improving link performance.

Figure 5:
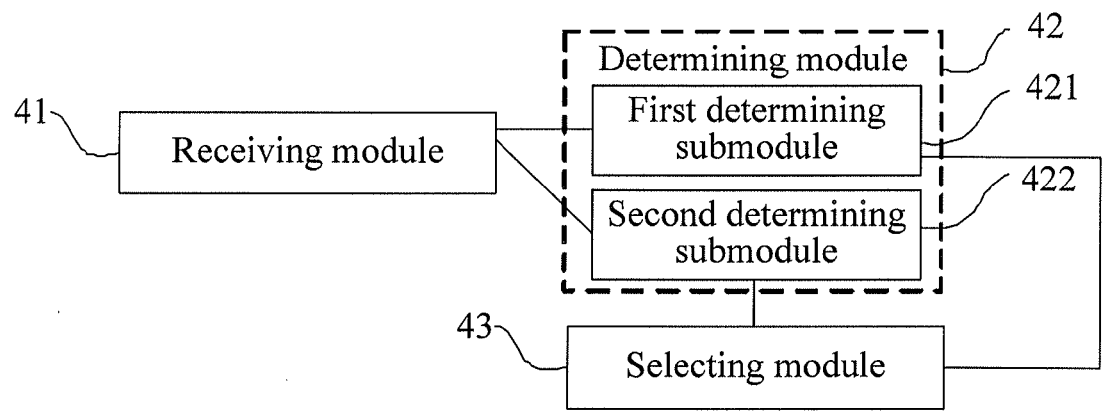
FIG. 5 is a schematic structural diagram of a transmitting device according to another embodiment of the present invention.

Further, the determining module 42 may further be configured to determine, according to the STBC type indication information, recommended information about STBC for the data frame related to the link adaptation feedback frame. The recommended information includes recommending a subsequent data frame not to use STBC, or recommending the subsequent data frame to use STBC. The selecting module 43 is further configured to determine, according to the recommended information determined by the determining module 42, the spatial stream or the MCS, or whether to use STBC in the next data frame. FIG. 5 is a schematic structural diagram of a transmitting device according to another embodiment of the present invention. Different from the transmitting device shown in FIG. 4, in the transmitting device shown in FIG. 5, the determining module 42 may include:

a first determining submodule 421, configured to determine that the data frame related to the link adaptation feedback frame does not use STBC when the STBC type indication information indicates that the link adaptation feedback frame is fed back with respect to a frame not using STBC, or determine that the data frame related to the link adaptation feedback frame is recommended to use STBC when the STBC type indication information indicates that the link adaptation feedback frame recommends the subsequent frame to use STBC; and a second determining submodule 422, configured to determine that the data frame related to the link adaptation feedback frame uses STBC when the STBC type indication information indicates that the link adaptation feedback frame is fed back with respect to a frame using STBC, or determine that the data frame related to the link adaptation feedback frame is not commended to use STBC when the STBC type indication information indicates that the link adaptation feedback frame does not recommend the subsequent frame to use STBC.

Further, the first determining submodule 421 is also configured to determine that the data frame related to the link adaptation feedback frame is commended to use STBC when the STBC type indication information indicates that the link adaptation feedback frame recommends the sent data frame to use STBC. The second determining submodule 422 is further configured to determine that the data frame related to the link adaptation feedback frame is not commended to use STBC when the STBC type indication information indicates that the link adaptation feedback frame does not recommend the subsequent frame to use STBC. In the above embodiment, after the receiving module 41 receives the link adaptation feedback frame sent by the receiving device, the determining module 42 determines, according to the STBC type indication information in the link adaptation feedback frame, information about use of STBC by a data frame related to the link adaptation feedback frame. Therefore, feedback information in the active link adaptation feedback mechanism is more complete, and according to the use information, the selecting module 43 may select a space-time stream, a bandwidth, and an MCS used when the transmitting device sends a data frame, thereby improving link performance.

Figure 6:
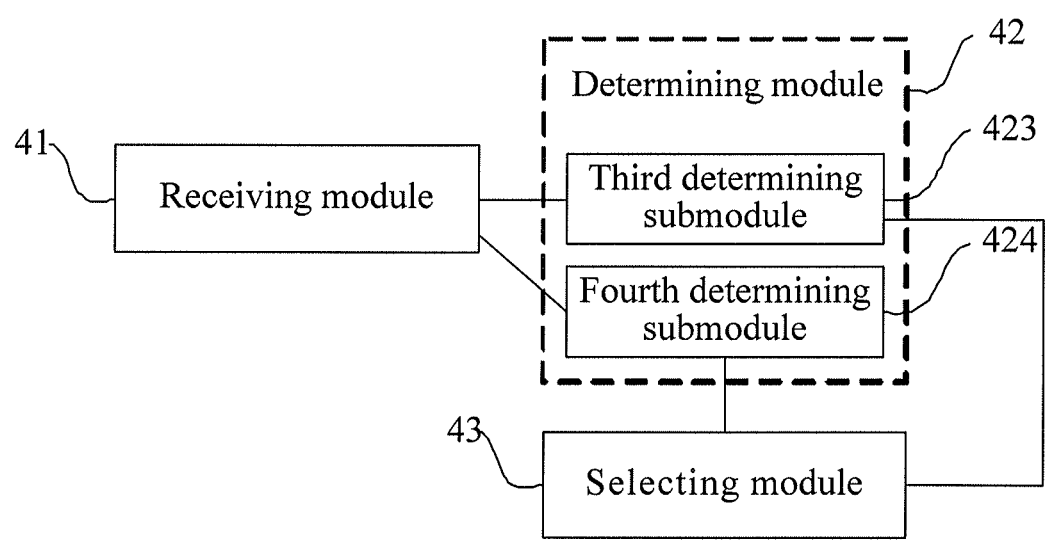
FIG. 6 is a schematic structural diagram of a transmitting device according to yet another embodiment of the present invention.

FIG. 6 is a schematic structural diagram of a transmitting device according to yet another embodiment of the present invention. Different from the transmitting device shown in FIG. 4, in the transmitting device shown in FIG. 6, the determining module 42 may include:

a third determining submodule 423, configured to determine on condition that BF is not used, that the data frame related to the link adaptation feedback frame does not use STBC, when on condition that BF is not used, the STBC type indication information indicates that the link adaptation feedback frame is fed back with respect to a frame not using STBC; and a fourth determining submodule 424, configured to determine on condition that BF is not used, that the data frame related to the link adaptation feedback frame uses STBC, when on condition that BF is not used, the STBC type indication information indicates that the link adaptation feedback frame is fed back with respect to a frame using STBC.

In the above embodiment, after the receiving module 41 receives the link adaptation feedback frame sent by the receiving device, the determining module 42 determines, according to the STBC type indication information in the link adaptation feedback frame, information about use of STBC by a data frame related to the link adaptation feedback frame. Therefore, feedback information in the active link adaptation feedback mechanism is more complete, and according to the use information, the selecting module 43 may select a space-time stream, a bandwidth, and an MCS used when the transmitting device sends a data frame, thereby improving link performance.

A person skilled in the art should understand that the accompanying drawings are merely schematic diagrams of an exemplary embodiment, and that modules or processes in the accompanying drawings are not necessarily required to implement the present invention.

A person skilled in the art should understand that modules in a device according to an embodiment may be distributed in the device of the embodiment according to the description of the embodiment, or may be correspondingly changed to be disposed in one or more devices different from this embodiment. The modules of the above embodiments may be incorporated into one module, or may be further divided into a plurality of submodules.

What is claimed is:

1. A link adaptation feedback method, comprising:
receiving, by a transmitting device, a link adaptation feedback frame sent by a receiving device, wherein the link adaptation feedback frame carries space-time block coding (STBC) type indication information; and
determining, by the transmitting device, according to the space-time block coding type indication information, information about use of space-time block coding by a data frame related to the link adaptation feedback frame,
wherein the determining, by the transmitting device, according to the space-time block coding type indication information, information about use of space-time block coding by a data frame related to the link adaptation feedback frame comprises at least one of:
if the space-time block coding type indication information indicates that the link adaptation feedback frame is fed back with respect to a frame not using space-time block coding, determining, by the transmitting device, that the data frame related to the link adaptation feedback frame does not use space-time block coding; and
if the space-time block coding type indication information indicates that the link adaptation feedback frame is fed back with respect to a frame using space-time block coding, determining, by the transmitting device, that the data frame related to the link adaptation feedback frame uses space-time block coding.

2. The method according to claim 1, wherein the determining, by the transmitting device according to the space-time block coding type indication information, information about use of space-time block coding by a data frame related to the link adaptation feedback frame comprises at least one of:
if on a condition that beamforming is not used, the space-time block coding type indication information indicates that the link adaptation feedback frame is fed back with respect to a frame not using space-time block coding, determining, by the transmitting device on the condition that beamforming is not used, that the data frame related to the link adaptation feedback frame does not use space-time block coding;
and if on the condition that beamforming is not used, the space-time block coding type indication information indicates that the link adaptation feedback frame is fed back with respect to a frame using space-time block coding, determining, by the transmitting device on the condition that beamforming is not used, that the data frame related to the link adaptation feedback frame uses space-time block coding.

3. The method according to claim 1, wherein the link adaptation feedback frame comprises a very high throughput format high throughput control field; and the procedure for the link adaptation feedback frame to carry the space-time block coding type indication information comprises:
adding a space-time block coding type field to the very high throughput format high throughput control field, to use a value of the space-time block coding type field as the space-time block coding type indication information.

4. The method according to claim 3, wherein the length of the space-time block coding type field is one bit.

5. The method according to claim 3, wherein:
if the value of the space-time block coding type field is set to "0", it indicates that the data frame related to the link adaptation feedback frame does not use space-time block coding, or
if the value of the space-time block coding type field is set to "1", it indicates that the data frame related to the link adaptation feedback frame uses space-time block coding.

6. The method according to claim 1, wherein the transmitting device further determines, according to the information about use of space-time block coding by the data frame related to the link adaptation feedback frame, whether the data frame sent by the transmitting device uses space-time block coding.

7. A transmitting device, comprising:
a receiver, configured to receive a link adaptation feedback frame sent by a receiving device, wherein the link adaptation feedback frame carries space-time block coding (STBC) type indication information;
a processor, configured to determine, according to the space-time block coding type indication information, information about use of space-time block coding by a data frame related to the link adaptation feedback frame;
wherein the processor is configured to perform at least one of:
determine that the data frame related to the link adaptation feedback frame does not use space-time block coding when the space-time block coding type indication information indicates that the link adaptation feedback frame is fed back with respect to a frame not using space-time block coding; and
determine that the data frame related to the link adaptation feedback frame uses space-time block coding when the space-time block coding type indication information indicates that the link adaptation feedback frame is fed back with respect to a frame using space-time block coding.

8. The transmitting device according to claim 7, wherein the processor is further configured to perform at least one of, determine on a condition that beamforming is not used, that the data frame related to the link adaptation feedback frame does not use space- time block coding, when on the condition that beamforming is not used, the space-time block coding type indication information indicates that the link adaptation feedback frame is fed back with respect to a frame not using space-time block coding;
and determine on the condition that beamforming is not used, that the data frame related to the link adaptation feedback frame uses space-time block coding, when on the condition that beamforrning is not used, the space-time block coding type indication information indicates that the link adaptation feedback frame is fed back with respect to a frame using space-time block coding.

9. The transmitting device according to claim 7, wherein:
the processor is further configured to determine, according to the STBC type indication information, recommended information about space-time block coding for the data frame related to the link adaptation feedback frame.

10. The transmitting device according to claim 7, wherein the link adaptation feedback frame comprises a very high throughput format high throughput control field; and the procedure for the link adaptation feedback frame to carry the space-time block coding type indication information comprises:
adding a space-time block coding type field to the very high throughput format high throughput control field, to use a value of the space-time block coding type field as the space-time block coding type indication information.

11. The method according to claim 10, wherein the length of the space-time block coding type field is one bit.

12. The method according to claim 10, wherein:
if the value of the space-time block coding type field is set to "0", it indicates that the data frame related to the link adaptation feedback frame does not use space-time block coding, or
if the value of the space-time block coding type field is set to "1", it indicates that the data frame related to the link adaptation feedback frame uses space-time block coding.

13. A link adaptation feedback method, comprising:
sending, by a receiving device, a link adaptation feedback frame to a transmitting device, wherein the link adaptation feedback frame carries space-time block coding (STBC) type indication information; to enable the transmitting device determine, according to the space-time block coding type indication information, information about use of space-time block coding by a data frame related to the link adaptation feedback frame,
wherein the transmitting device determine, according to the space-time block coding type indication information, information about use of space-time block coding by a data frame related to the link adaptation feedback frame comprises at least one of:
if the space-time block coding type indication information indicates that the link adaptation feedback frame is fed back with respect to a frame not using space-time block coding, the transmitting device determine that the data frame related to the link adaptation feedback frame does not use space-time block coding; and
if the space-time block coding type indication information indicates that the link adaptation feedback frame is fed back with respect to a frame using space-time block coding, the transmitting device determine that the data frame related to the link adaptation feedback frame uses space-time block coding.

14. The method according to claim 13, wherein the link adaptation feedback frame comprises a very high throughput format high throughput control field; and the procedure for the link adaptation feedback frame to carry the space-time block coding type indication information comprises:
adding a space-time block coding type field to the very high throughput format high throughput control field, to use a value of the space-time block coding type field as the space-time block coding type indication information.

15. The method according to claim 14, wherein the length of the space-time block coding type field is one bit.

16. The method according to claim 14, wherein:
if the value of the space-time block coding type field is set to "0", it indicates that the data frame related to the link adaptation feedback frame does not use space-time block coding, or
if the value of the space-time block coding type field is set to "1", it indicates that the data frame related to the link adaptation feedback frame uses space-time block coding.

17. A receiving device, comprising:
a transmitter, configured to send a link adaptation feedback frame to a transmitting device, wherein the link adaptation feedback frame carries space-time block coding (STBC) type indication information; to enable the transmitting device determine, according to the space-time block coding type indication information, information about use of space-time block coding by a data frame related to the link adaptation feedback frame, wherein the transmitting device determine, according to the space-time block coding type indication information, information about use of space-time block coding by a data frame related to the link adaptation feedback frame comprises at least one of:

if the space-time block coding type indication information indicates that the link adaptation feedback frame is fed back with respect to a frame not using space-time block coding, the transmitting device determine that the data frame related to the link adaptation feedback frame does not use space-time block coding; and if the space-time block coding type indication information indicates that the link adaptation feedback frame is fed back with respect to a frame using space-time block coding, the transmitting device determine that the data frame related to the link adaptation feedback frame uses space-time block coding.

18. The receiving device according to claim 17, wherein the link adaptation feedback frame comprises a very high throughput format high throughput control field; and the procedure for the link adaptation feedback frame to carry the space-time block coding type indication information comprises:

adding a space-time block coding type field to the very high throughput format high throughput control field, to use a value of the space-time block coding type field as the space-time block coding type indication information.

* * * * *